(12) United States Patent
Rigal et al.

(10) Patent No.: US 9,289,847 B2
(45) Date of Patent: Mar. 22, 2016

(54) METHOD FOR MANUFACTURING A MODULE WITH A HOLLOW REGION, PREFERABLY FOR FLUID CIRCULATION

(75) Inventors: Emmanuel Rigal, Sassenage (FR); Philippe Bucci, Engins (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 99 days.

(21) Appl. No.: 13/393,649

(22) PCT Filed: Sep. 3, 2010

(86) PCT No.: PCT/EP2010/062921
§ 371 (c)(1),
(2), (4) Date: Mar. 1, 2012

(87) PCT Pub. No.: WO2011/026925
PCT Pub. Date: Mar. 10, 2011

(65) Prior Publication Data
US 2012/0160900 A1    Jun. 28, 2012

(30) Foreign Application Priority Data

Sep. 7, 2009 (FR) ...................... 09 56066

(51) Int. Cl.
*B23K 20/00* (2006.01)
*B23K 20/02* (2006.01)
*F28F 3/04* (2006.01)
*F28F 3/12* (2006.01)

(52) U.S. Cl.
CPC .............. *B23K 20/021* (2013.01); *B23K 20/02* (2013.01); *B23K 20/023* (2013.01); *F28F 3/048* (2013.01); *F28F 3/12* (2013.01); *B23K 2201/14* (2013.01)

(58) Field of Classification Search
CPC ......... F28F 3/12; F28F 3/048; F28F 2260/02; B23K 20/021; B23K 20/023; B23K 20/02; B23K 20/1235; B23K 31/02
USPC .................................................. 228/193, 161
See application file for complete search history.

(56) References Cited

U.S. PATENT DOCUMENTS 4,677,724 A   7/1987  Kuroki
5,284,288 A   2/1994  Woodward
(Continued)

FOREIGN PATENT DOCUMENTS

FR    2 879 488    6/2006
GB    2 269 556    2/1994
(Continued)

OTHER PUBLICATIONS

U.S. Appl. No. 13/496,212, filed Mar. 15, 2012, Couturier, et al.

*Primary Examiner* — Erin Saad
(74) *Attorney, Agent, or Firm* — Oblon, McClelland, Maier & Neustadt, L.L.P.

(57) ABSTRACT

A manufacturing method for a module having a hollow region, including: making an assembly including at least one recessed plate having a recess open at one face, defining thereon a recess outline and, between the face and the immediately adjacent plate of the assembly, a strand of material lying along the recess outline; treating the assembly, aiming to obtain diffusion bonding of the strand to the plate(s) with which it is in contact, to constitute, along its associated recess outline, a gas-tight connection of the two plates between which it is placed; and consolidating the assembly by hot isostatic pressing.

18 Claims, 5 Drawing Sheets

(56) References Cited

U.S. PATENT DOCUMENTS

2004/0099712 A1* 5/2004 Tonkovich et al. ........... 228/193
2005/0077341 A1* 4/2005 Larrieu et al. ................ 228/193
2008/0116246 A1* 5/2008 Rigal et al. ................... 228/193

FOREIGN PATENT DOCUMENTS

| JP | H08-35506 | 2/1996 |
| JP | 2008-39255 | 2/2008 |

* cited by examiner

METHOD FOR MANUFACTURING A MODULE WITH A HOLLOW REGION, PREFERABLY FOR FLUID CIRCULATION

TECHNICAL FIELD

The invention relates generally to the field of manufacture, by diffusion bonding brought about by hot isostatic pressing, of modules having a hollow region.

In particular, the invention applies to the manufacture of modules the hollow region whereof takes the form of one or of a plurality of channels, preferably designed for fluid circulation.

Numerous applications can be contemplated for this module, such as heat exchangers, and preferably those called compact plate heat exchangers, for which the heat exchange obtained is very satisfactory due to the large ratio of the heat exchange surface areas to the volume of the exchanger. For example, this can involve a heat exchanger system comprising a module or a stack of modules forming alternately, in a plate stacking direction, a first fluid circulation region and a second fluid circulation region, and so designed that a chemical reaction, which may be catalytic, occurs in at least one of these fluid circulation regions. Thus, due to the chemical reaction found within at least one of these regions, such exchangers are also called reactors. More generally, such heat exchangers are called exchanger/reactors.

It is noted that several uses can be contemplated for this type of exchanger system, for example the production of chemical or pharmaceutical products, or even fuel cell installations.

Other applications can also be contemplated for the hollow module, in refrigerated pressurized devices, thermal absorbers, heat recuperators and, more generally, in all devices having internal fluid circulation channels.

PRIOR STATE OF THE ART

From prior art is known the manufacture of a hollow module based on two grooved plates, pressed together to jointly define cavities wherein are inserted tubes, the geometry whereof corresponds to that of the desired circulation channels. In this hypothetical case, the surfaces to be assembled by diffusion are first cleaned, the parts stacked, then the perimeter of the plates is made gas-tight by welding or by inserting the plates into an envelope made gas-tight by welding. Likewise, the perimeter of the ends of the tubes is made gas-tight by welding to the same two plates or to the envelope. This envelope is called the can.

After conventional degassing of the assembly thus formed, it is subjected to a hot isostatic pressing cycle during which the pressurization gas is not permitted to penetrate into the interfaces between the elements of the assembly, these then being allowed to bond themselves suitably to one another by diffusion. However, the pressurization gas penetrates into the tubes, such that they are subjected to the same pressure as that of the outer surfaces of the assembly. As a result, no crushing of the tubes takes place, which preserves their initial geometry.

However, in certain cases the shape of the channels is such that it cannot be made from tubes, particularly when it includes elbows that are too tight to be obtained by bending straight tubes.

In this connection, it is noted that the assembly by diffusion bonding in hot isostatic pressing of grooved plates, without inserting tubes between them, is possible only at the price of a considerably degradation of the structure. Indeed, if the inlets and outlets of the channels are not plugged in a gas-tight fashion, the pressurization gas penetrates between the grooved plates and prevents them from being bonded. Conversely, if the inlets and outlets of the channels are plugged gas-tight, they are crushed by the pressure, which leads to an unacceptable loss of dimensional accuracy of the channels, or even to their total disappearance. In such a case, reducing the pressure would of course lead to less crushing of the channels, but would also be accompanied by a reduction in the strength of the bonded joints.

Another technical solution for avoiding crushing of the channels consists of filling the grooves with cores made of a material capable of being eliminated after assembly, by chemical dissolution or by some other means, such as that described in document JP-A-2006 263746. In practice, however, the specification of the filler material and its elimination have proven to be very difficult.

Yet another manufacturing method is known from document FR-A-2 879 489. It consists of machining grooves foreshadowing the channels into a plate, sealing the top of these grooves by applying thin strips to them by welding, then assembling to the plate, by hot isostatic pressing, a second element in the form of a lid covering the thin strips. This solution exhibits several disadvantages, among them high cost, the difficulty of welding on thin strips when the channels are not straight, the difficulty of inspecting and guaranteeing the gas-tightness of all the welds of the strips for a structure including multiple channels or great lengths of channels, or even the impossibility of building channels having an irregular channel width over the depth of the channel, with a view to the production of so-called "3D" channels.

Finally, another manufacturing method is known from the document entitled "HIP experiments on the first wall and cooling plate specimens for the EU HCPB blanket," P. Norajitra et al., *Journal of Nuclear Materials* 307-311 (2002). Described there is a method consisting of assembling elementary parts, by diffusion bonding in hot isostatic pressing, in two steps. All or some of the elementary parts make it possible to reconstitute, by juxtaposing them, the desired channels. These elementary parts are inserted into a gas-tight can to form an assembly which is then degassed, then plugged. Alternatively, the perimeter of the elementary parts is welded gas-tight and the channels are plugged, again so as to form a gas-tight envelope enclosing the hollow region.

During the first diffusion bonding step, the temperature and pressure conditions of the hot isostatic pressing, as well as the duration of the step, are normally provided so as to, on the one hand, obtain a bonding of the parts that makes their interfaces gas-tight, and on the other hand such that deformations of the channels, if any, remain negligible.

After this first step, the assembly is drilled opposite the channels, preferably at right angles to the stack, so as to allow air to penetrate it. The gas-tightness of the hollow region is then breached. There follows a second diffusion bonding step, carried out at a higher pressure so as to guarantee the achievement of a good quality diffusion bond between the elementary parts. During this second step, the pressurization gas penetrates into the channels, unlike in the first bonding step, which makes it possible to avoid crushing of the channels and to have them retain an acceptable geometry.

This solution exhibits a major disadvantage, which is that the compromise to be adopted for the temperature and pressure conditions of the hot isostatic pressing, in order to provide for bonding at the interfaces without altering too severely the shape of the channels, often proves difficult to discover. Indeed, it has been observed that in a substantial number of cases the pressure needed for obtaining satisfactory gas-tightness at the interfaces brings about crushing of the channels, while concurrently the maximum pressure producing only negligible deformation of the channels is not sufficient for obtaining satisfactory gas-tightness at the interfaces.

DISCLOSURE OF THE INVENTION

The invention therefore has the purpose of at least partially correcting the disadvantages mentioned above connected with prior art developments.

To this end, the invention has as its object a manufacturing method for a module having a hollow region comprising:
- a step consisting of making an assembly consisting of plates stacked according to a stacking direction and defining the hollow region, among them at least one recessed plate having a recess constituting all or part of the hollow region and open at one of its faces at least, defining thereon a recess outline, said assembly comprising, between each face defining a recess outline and the immediately adjacent plate of the assembly in the stacking direction, a strand of material following said recess outline;
- a step consisting of treating the assembly for the purpose of obtaining diffusion bonding of each strand of material to the plate(s) of the assembly with which it is in contact, so that it constitutes, along its associated recess outline, a gas-tight connection of the two plates between which it is placed; and
- a step consisting of consolidating the assembly by hot isostatic pressing, carried out so as to obtain a diffusion bond between its elements, said consolidation step implemented by allowing a pressurization gas to enter said hollow region.

The originality of the invention resides in the implantation of the strand of material which, during the treatment step, is subjected to a substantial plastic deformation favoring diffusion bonding. This is explained by the fact that its section in the plane orthogonal to the stacking direction is considerably smaller than that of the portion of the recessed plate that is in relief, so that the crushing force that it undergoes is much greater.

Consequently, for this treatment step, it is easy to find a pressure which is sufficient for the strand of material to bond itself to the plate(s) of the assembly with which it is in contact, thus ensuring a gas-tight connection of the two plates between which it is placed, without thereby causing any deformation of those plates. Advantageously, the bonding at the interfaces is thus accomplished and the geometry of the hollow region maintained. In this regard, it is noted that the treatment step is preferably implemented by hot isostatic pressing, even though any other diffusion bonding technique can be employed such as for example the use of a uniaxial press, of a weight, or even of a clamping system.

When the hot isostatic pressing technique is employed for the treatment step, the pressurization gas is forbidden to enter the hollow region, in order to avoid disrupting the bonding at the contact surfaces of the strand.

As mentioned above, the diffusion bonding observed during this treatment step is sufficient for obtaining gas-tightness at the strand of material, but has low mechanical strength, which is intended to be consolidated by the implementation of the subsequent consolidation step. Before the initiation of this step, it is arranged that the pressurization gas be able to penetrate into the hollow region, preferably by drilling one and/or the other of the stacked plates previously mentioned. This makes it possible to apply a very high pressure, favoring the achievement of high mechanical strength at the diffusion-bonded interfaces, without causing crushing of the hollow region, which can thus retain the desired geometry. This is explained by the fact that the inside of the hollow region is subjected to the same pressure as that applied to the outer surfaces of the assembly undergoing pressing.

In addition, the invention allows great freedom in shaping the hollow region, having preferably the form of channels, particularly if they are made by laser cutting in a plate. The complex shape of the channels obtained, for example of "3D" channels, leads advantageously to obtaining a compact module having very high thermal performance when it is used within an exchanger, and having high performance in a mixture of chemical reactants when it is used within an exchanger/reactor.

Finally, it does not require brazing to assemble the elements, and therefore does not give trouble in the event that corrosive fluids are used.

Preferably, each strand of material is designed integrally with its associated recessed plate, or applied to the assembly as an insert. In the latter case, during the treatment step, the strand bonds itself by diffusion to the two plates between which it is interposed, providing a gas-tight seal between them.

Preferably, at least one recessed plate of the assembly has a recess forming all or a portion of the hollow region and open at only one of its faces while defining thereon a recess outline. It is then provided that the strand of material associated with the recessed plate defining a recess open at only one of its faces cooperates with a solid plate or another recessed plate of the assembly. The solid plate fulfills the function of closing off the hollow region, while the recessed plate forms the rest of it. In the latter case, these two recess outlines, respectively provided in the two opposite faces of the two recessed plates, are preferably identical or similar.

Alternatively or concurrently, it is possible to provide that at least one recessed plate of the assembly has a recess forming all or a portion of the hollow region and open at both its opposite faces, this through recess defining on each of the two opposite faces a recess outline. It is then provided that each of the two strands of material associated with the recessed plate defining a through recess cooperates with a solid plate or with another recessed plate of the assembly. Here too, in the latter case, the two recess outlines respectively provided on the two opposing faces of the two recessed plates, are preferably identical or similar.

Naturally, the assembly can include a stack of plates according to one of the solutions described above, or according to a combination of these solutions.

As mentioned above, said assembly treatment step is also carried out by hot isostatic pressing, at a pressure lower than that employed for said consolidation step.

Preferably, the assembly is made in such a way that before its treatment step, the area, in orthogonal projection in the stacking direction, of the face of the plate having the recess is at least N times greater than the area of its associated strand of material, N being greater than 1.5 and preferably greater than 3. Even more preferably, N is greater than 4.

The compression force being inversely proportional to the section of the material in the plane orthogonal to the stacking direction, the high value of N favors the deformation of the strand of material rather than that of the portion of the recessed plate that is in relief, which ends at the aforementioned face of the plate. This makes it possible to obtain a good gas-tight seal at the plastically deforming strand of material while still maintaining the integrity and the geometry of the plates.

Preferably, said assembly also includes, between each face of the recessed plate defining a recess outline and the directly adjacent plate of the assembly in the stacking direction, a peripheral strand of material along the perimeter of these two plates, the subsequent assembly treatment step also aiming to obtain diffusion bonding of each peripheral strand of material to the plate(s) of the assembly with which it is in contact in order to form, along their perimeter, a gas-tight connection of the two plates between which it is placed.

One alternative would be to weld the plates together at their perimeter, before the treatment step, for example by TIG welding.

Preferably, said hollow region has the form of a plurality of fluid circulation channels.

Preferably, said module is designed to equip a heat exchanger system, even though all the applications mentioned above can be contemplated without departing from the scope of the invention.

Preferably, said module has the form of a plate, like most of the elements constituting the assembly.

Other advantages and characteristics of the invention will appear in the detailed, non-limiting description below.

BRIEF DESCRIPTION OF THE DRAWINGS

This description will be given with reference to the appended drawings among which.

DETAILED DESCRIPTION OF PREFERRED EMBODIMENTS

Figure 1:
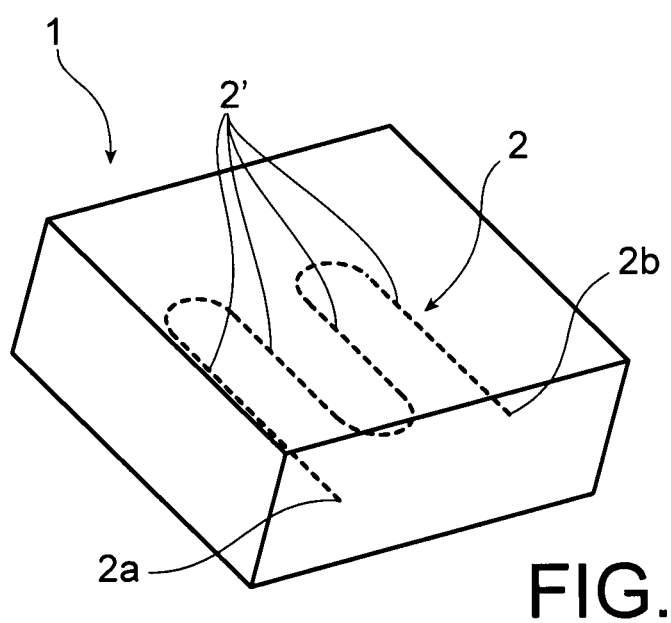
FIG. 1 shows a schematic perspective view of a fluid circulation module obtained as a result of the implementation of the method according to a preferred embodiment of the present invention.

Referring to FIG. 1, there can be seen a module 1 for a heat exchanger system, preferably of the plate heat exchanger type, designed for example to extract the heat produced by a nuclear reactor.

Typically, this module has a length on the order of 10 to 30 cm, a width on the order of 10 to 15 cm and a thickness on the order of 1 to 5 cm. However, any kind of dimensioning can be contemplated, depending on the application of the system.

The module 1, the manufacturing method whereof that is specific to the present invention will be described hereafter, has a substantially paralellopipedal or plate-like shape through which runs a plurality of fluid circulation channels 2. In the example shown, a single channel 2 is given having an inlet 2a and an outlet 2b, between which is a plurality of preferably mutually parallel channel segments 2'. The segments 2' are joined in pairs at their corresponding ends. The channel segments 2' can be substantially rectilinear as is shown schematically by the dotted lines of FIG. 1, or assume any other form considered appropriate, such as the so-called bent or zigzag form. In addition, the section of these channels 2 can also be adapted depending on the needs encountered. By way of an indicative example, it can be square, rectangular, or even of changing shape in order to create a "3D" channel.

Figure 2:
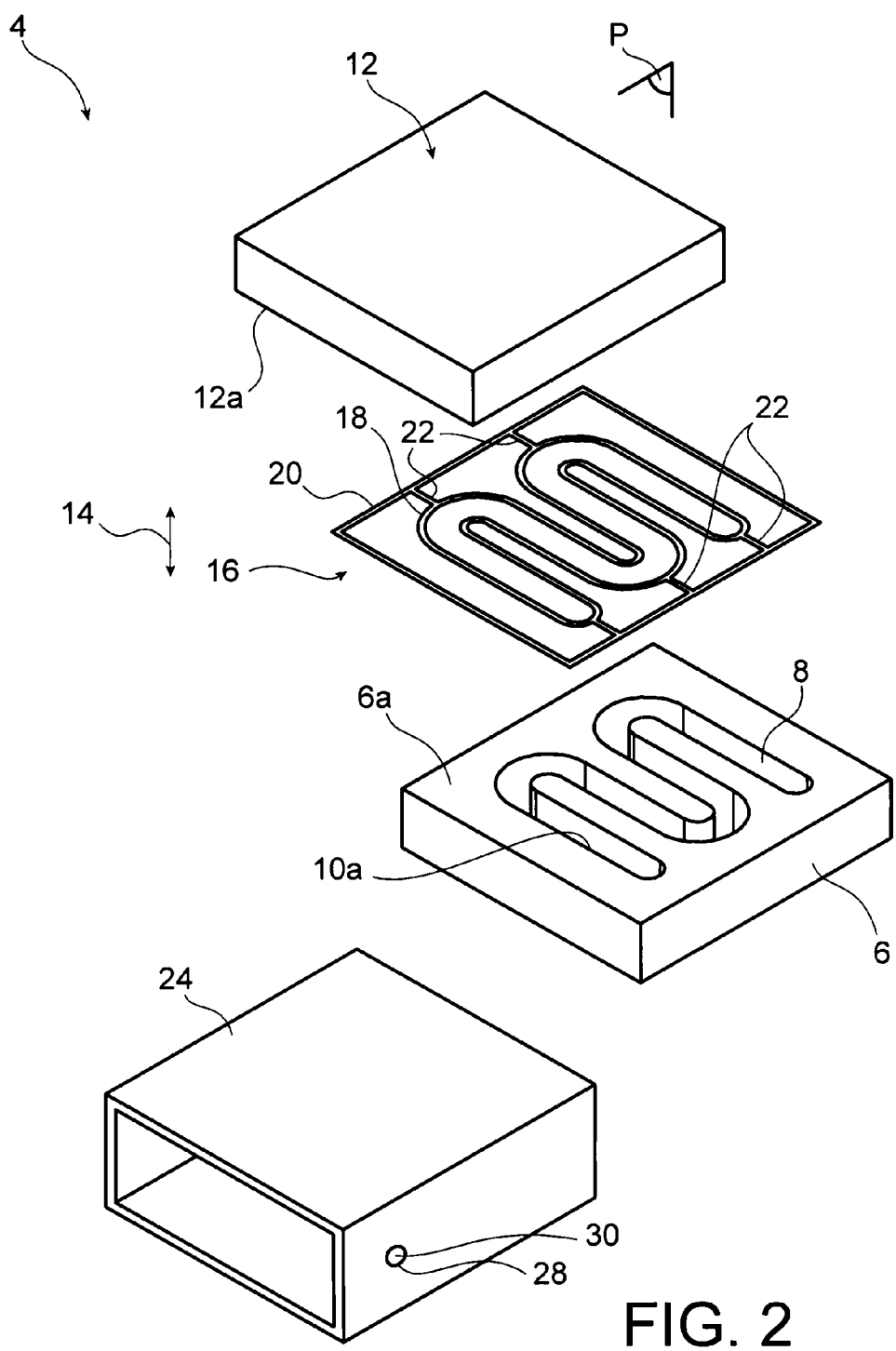
FIG. 2 shows an exploded perspective view of the assembly designed to form said module of FIG. 1, before its treatment.

To proceed with the manufacture of this module 1, an assembly of stacked elements is first made, this assembly being referred to generally by the label 4 in FIG. 2.

The stacking can be carried out on a conventional base, preferably horizontal, on which is first placed a metal plate 6, preferably made of X2CrNiMo17-12-2 stainless austenitic steel. The plate 6 exhibits a recess 8 open on its upper face 6a, this recess 8 constituting the entire channel 2. To obtain this blind recess 8, which defines on the face 6a a recess outline or channel outline, conventional machining is preferably performed, preferably by milling.

In the example shown, the section of each channel segment is substantially square, measuring about 10 mm on a side, on a recessed plate 6 which is also substantially square, 10 cm on a side and 25 mm thick.

The assembly 4 also includes an upper plate 12, solid or non-recessed, preferably also made of X2CrNiMo17-12-2 stainless austenitic steel, being also substantially square, 10 cm on a side and 15 mm in thickness.

These two plates 6, 12 are stacked along a stacking direction 14 substantially orthogonal to the plates, which are therefore preferably flat, but which can alternatively be slightly curved.

The upper plate 12 therefore has the function of closing off in an upward direction, by its flat lower face 12a, the recess 8 of the plate 6 constituting a channel.

Figure 3:
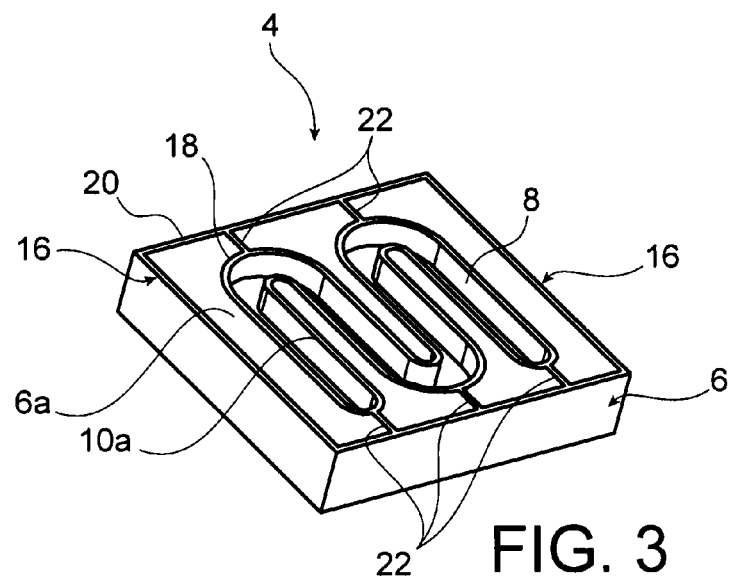
FIG. 3 shows a non-exploded perspective view of a portion of the assembly shown in FIG. 2.

One if the features of the present invention lies in the implantation, in the assembly 4 between the two plates 6, 12, of an insert 16 which incorporates a strand of material 18 lying along the recess outline 10a, that is extending its lateral surface while standing out from the face 6a, as can best be seen in FIG. 3. The strand of material 18 therefore defines a closed line, with a rectangular cross-section having a height on the order of 0.3 mm and a width on the order of 1 mm. Here too the strand is preferably made of X2CrNiMo17-12-2 stainless austenitic steel, though a different material from that selected for the plates 6, 12 could be chosen without departing from the scope of the invention. Among these materials favoring diffusion bonding are for example steels, alloys of nickel, of copper, of titanium, of zirconium, of aluminum and of refractory materials. It is noted that this same type of material can be used for making the plates 6, 12.

In the assembly 4, the interposition of the strand 18 between the plates 6, 12 therefore creates a clearance between their opposite faces 6a, 12a, the magnitude of this clearance corresponding to the height of the strand 18.

Figure 4:
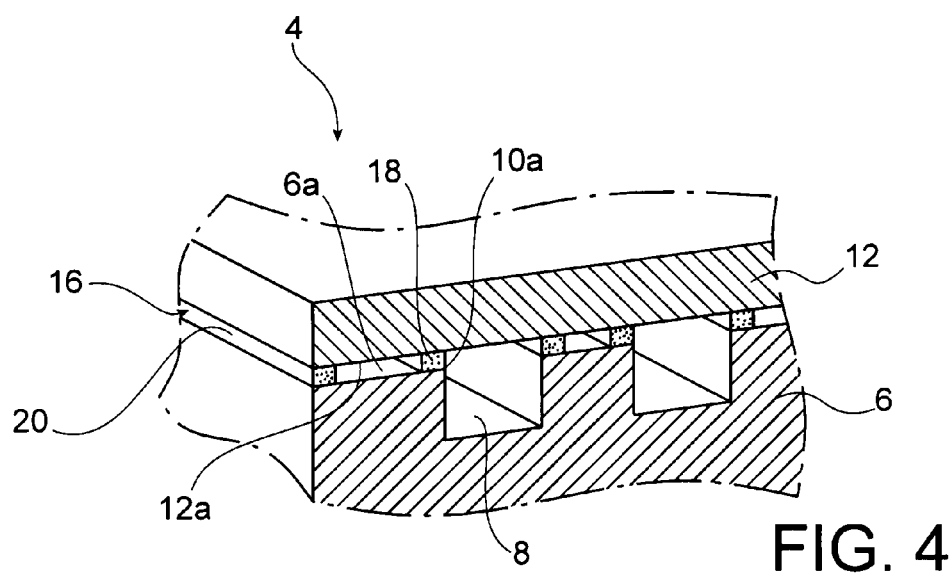
FIG. 4 shows a perspective view of a portion of the assembly sectioned along plane P of FIG. 2.

In the preferred embodiment described, the insert 16 also includes a peripheral strand of material 20 between the two plates 6, 12 and lying along their perimeter as can be seen in FIGS. 3 and 4. This strand 20 then takes on the shape of a closed square line, with a section preferably identical to that of the strand 18, and of the same material. To interconnect the two strands 18, 20, connecting strands 22, preferably straight, are provided, positioned at places where the spacing between the two strands 18, 20 is least. The same section and the same material are also selected for these connecting strands 22.

The insert 16 can be made by machining or by cutting it out, preferably from a thin metal sheet, preferably by cutting using a water jet or a laser.

In orthogonal projection in the stacking direction 14, the area of the face 6a of the plate 6 is very substantially greater than the area of the insert, where a ratio R on the order of 3 to 7 can be selected. This ratio is of course identical to that between a section of the portion of the plate 6 that is in relief, ending at the face 6a, and the section of the insert 16, respectively in planes orthogonal to the stacking direction 14.

In the preferred embodiment, the section of the portion of the plate 6 that is in relief, that is the grooved portion which defines the recess 8, in a plane orthogonal to the stacking direction 14, amounts to 72% of the section of the solid portion of this plate 6, also in a plane orthogonal to the stacking direction 14.

Concurrently, the section of the insert 16 in a plane orthogonal to the stacking direction 14 amounts to 12.4% of the section of the solid part of the plate 6, also in a plane orthogonal to the stacking direction 14, the latter section corresponding to the transverse section of the insert.

Thus, the ratio R mentioned above is here on the order of 5.8.

The manufacture of the assembly 4 is continued by sliding the stack of plates into a gas-tight envelope 24, which is then closed at its ends, also in a gas-tight fashion. This envelope, also called the can, then has an internal volume with a shape matching that of the stack. This technique is particularly preferred when the desired module includes several fluid circulation levels (case not shown), to with several channels stacked along the stacking direction of the plates, obtained by stacking plates 6, 12.

However, one alternative implementation consists of welding the two plates 6, 12 one on top of the other at their perimeter, preferably by TIG welding, in order to form a gas-tight envelope enclosing the channel 2 constituting a hollow region.

The manufacture of the module 1 is continued by treating the assembly 4 by hot isostatic pressing. Before pressing, degassing of the assembly is carried out by pumping through an opening 28 made in the envelope 24, here in one of the lateral walls as shown in FIG. 2. Once degassing is accomplished, the opening 28 is closed with a plug 30 so as to achieve gas-tightness of the channel/recess with respect to the outside of the assembly 4.

The pressing of the assembly 4 is performed inside an appropriate enclosure (not shown) by applying temperature and pressure conditions which will now be detailed.

A rise in pressure and temperature is brought about so that they attain the values P1 and T1 respectively, set for example at 6 Mpa and 1000° C. respectively. The treatment is applied for a period on the order of 2 hours, during which the compression force exerted on the portion of the plate 6 that is in relief is about 6/0.72, or about 8.3 Mpa, and the compression force exerted on the insert 16 is about 6/0.124 MPa, or about 48.3 Mpa, that is to say 5.8 times greater.

The strands 18, 20, 22 therefore have a tendency to deform plastically during the low-pressure treatment, and bond by diffusion to the plates 6, 12 between which they are placed, at the faces 6a, 12a. During the diffusion bonding of these strands that are compressed in the stacking direction, the force applied to the plates 6, 12 is not sufficient to bring about their deformation, so that the geometry of the recess 8 remains preserved. What is more, as the strands gradually compress while deforming plastically, their section in a plane orthogonal to the stacking direction increases, and the compression force decreases in like degree until the strands cease to deform. Stopping the hot isostatic pressing can also be contemplated for terminating the treatment step.

The bonding observed during this treatment step is therefore sufficient for achieving gas-tightness of the interfaces of the insert, but has low mechanical strength, which is intended to be consolidated by the implementation of a subsequent consolidation step, also by hot isostatic pressing. Here, the aforementioned interfaces are of course the contact surfaces between the strands 18, 20, 22 and the faces 6a, 12a of the plates 6 and 12.

An intermediate step consists of drilling the treated assembly 4, in order to have the recess 8 constituting a channel communicate with the outside of this assembly. Preferably, this communication is carried out by drilling through one and/or the other of the plates 6, 12 facing the channel 8, at right angles to the stack. This step can be carried out using any technique considered appropriate.

The consolidation step is then carried out following a rise in temperature and in pressure, respectively to a value T2 on the order of 1100° C. and a value P2 on the order of 120 MPa. This step lasts approximately 3 hours, during which the pressure applied is therefore much higher than during the treatment step. This favors obtaining good mechanical strength at the diffusion-bonded interfaces, that is at the faces 6a and 10a. What is more, due to the fact that the inside of the recess 8 is here subjected to the same pressure as that applied to the outside surfaces of the assembly undergoing pressing, the assembly 4 does not collapse.

The so-called monolithic module 1 is then obtained, corresponding to a massive block, multi-material for example, through which runs a fluid circulation channel 2.

Before using the module 1, one or more machining operations are carried out in order to allow entry/exit of the fluid in the module's channel.

During use of the module in a heat exchanger system, the fluid is for example brought in by an intake manifold (not shown) placed at the inlet 2a of the channel 2. The fluid then circulates in a serpentine path in the channel 2, before escaping from it through the outlet 2b and entering for example an exhaust manifold (not shown) of the system.

Figure 5:
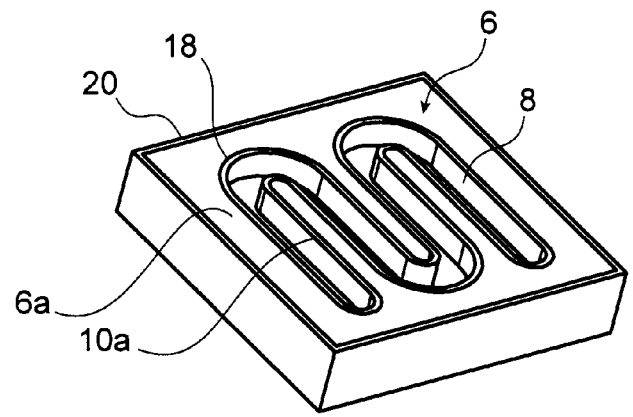
FIG. 5 shows a view similar to that of FIG. 3, the assembly exhibiting the form of an alternative embodiment.

With reference at present to FIG. 5, an alternative embodiment can be seen wherein the recessed plate 6 of the assembly incorporates, as a single unit, the peripheral strand 20 and the strand of material 18 lying along the recess outline 10a. Thus, these two strands 18, 20 stand out from the upper face 6a of the recessed plate, taking the form of a bead with a section that is substantially identical to that described for the strands of the insert of the foregoing embodiment. Thus, this insert is no longer needed in the stacked assembly and the strands 18, 20 are designed to contact, with their upper portions, only the lower face 12a of the solid plate 12, still with the purpose of obtaining gas-tight connections between the two plates 6, 12 at the strands.

Figure 6:
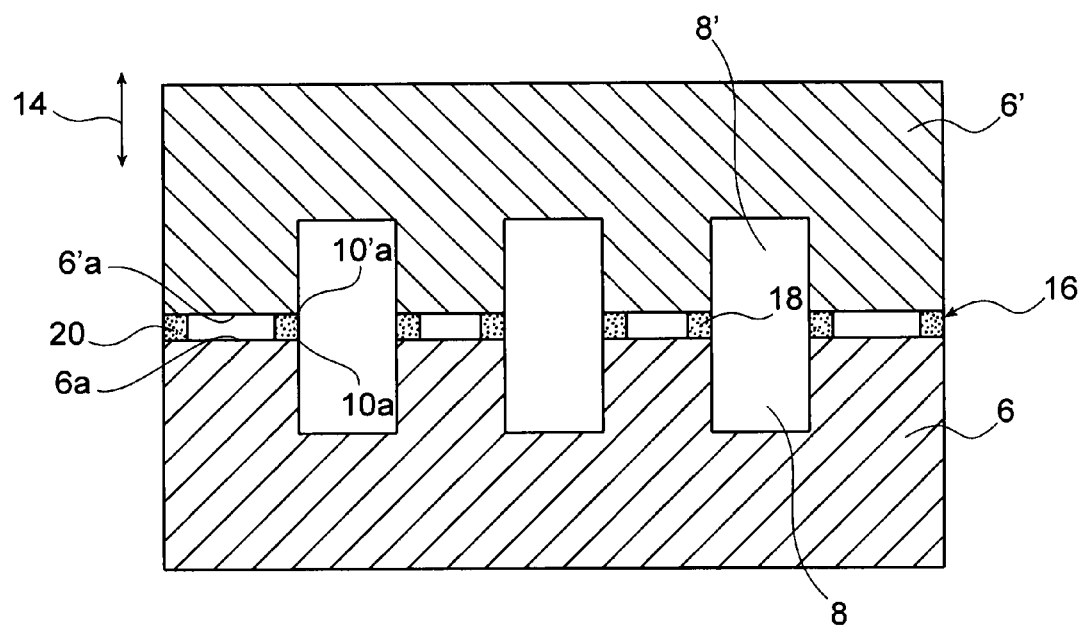
FIG. 6 shows a section view of the assembly exhibiting the form of another alternative embodiment.

FIG. 6 shows a different embodiment of the assembly 4 wherein the upper plate of the stack is replaced by a recessed plate 6', with a shape that is identical or similar to that of the lower recessed plate 6, which is retained. The plate 6' is, however, turned over so that its recess 8', open at its lower face 6'a, is facing the recess 8, the two recesses 8, 8' extending one another and jointly constituting the channel to be obtained. Furthermore, in the stacking direction 14, the recess outline 10'a on the face 6'a and the recess outline 10a on the face 6a are merged, and each is extended by the strand 18 of the insert 16 interposed between the two plates 6, 6'.

Figure 7:
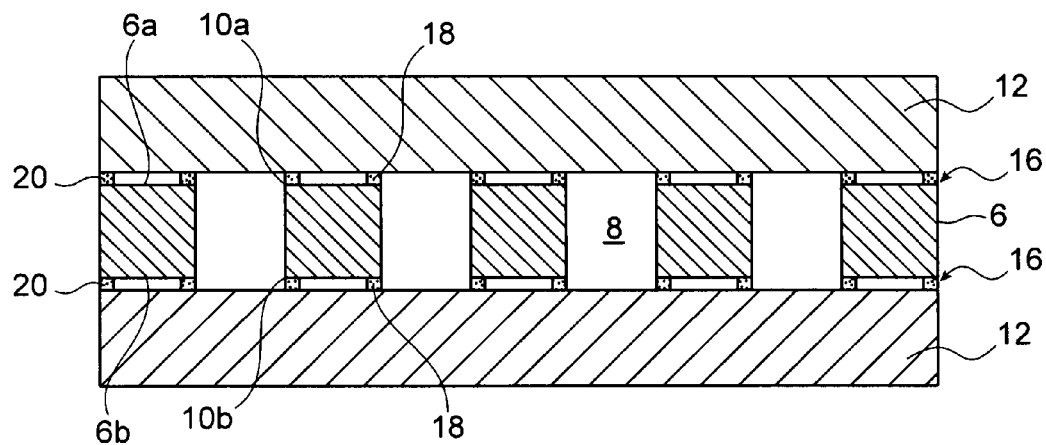
FIG. 7 shows a view similar to that of FIG. 6, the assembly exhibiting the form of another alternative embodiment.
Figure 8:
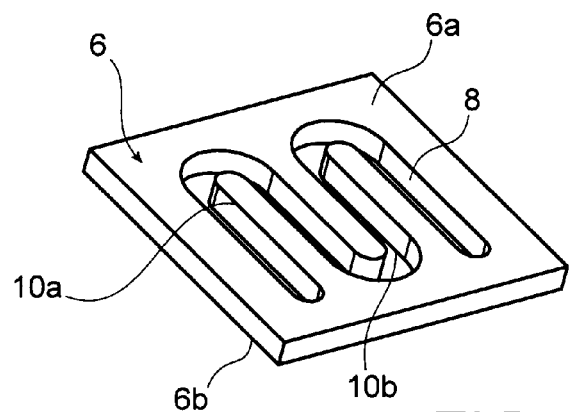
FIG. 8 shows a recessed plate constituting an integral part of the assembly shown in FIG. 7.

Finally, in an embodiment shown in FIGS. 7 and 8, the recessed plate 6 has a through recess 8, which is therefore open both at its upper surface 6a and at its lower surface 6b, so as to define a recess outline 10a and a recess outline 10b, respectively. The recess 8, designed to constitute the entire channel, is closed off at its upper portion by the upper solid plate 12, identical to that described previously, and closed off at its lower portion by a lower solid plate 12, identical to the upper solid plate.

Here too, an insert 16 is interposed between the recessed plate 6, preferably made by laser cutting, and each of the solid plates 12.

In the embodiments of FIGS. 6 through 8, the insert solution can naturally be replaced by a solution using strands integrated with the recessed plates, as was shown with reference to FIG. 5.

Of course, various modifications can be applied, by one skilled in the art, to the invention that was just described solely by way of non-limiting examples.

The invention claimed is:

1. A method for manufacturing a module having a hollow region, comprising:
    making an assembly of plates stacked in a stacking direction and defining the hollow region, including at least one recessed plate having a recess constituting all or part of the hollow region and open at at least one of its faces, defining thereon a recess outline, the assembly including, between each face defining a recess outline and the plate of the assembly that is immediately adjacent in the stacking direction, a strand of material comprising a linear element defining a closed line lying along and contacting the entire circumventing top edge of the hollow region at an intersection of the hollow region and a face of the plate, with substantially all segments of the closed line of said strand of material along the entire circumventing top edge of the hollow region extending only along the top edge and not substantially extending over the hollow region;
    treating the assembly to achieve a first diffusion bonding of each strand of material to the plates with which the strand is in contact, to constitute, along the associated recess outline, a gas-tight connection of the two plates between which it is placed; and
    thereafter, consolidating the assembly by hot isostatic pressing, carried out to achieve a second diffusion bonding of the plates and the strand of material together, the consolidating being implemented while allowing pressurization gas to enter the hollow region.

2. A method according to claim 1, wherein each material strand is designed in a single unit with its associated recessed plate, or is applied to the assembly as an insert.

3. A method according to claim 1, wherein at least one recessed plate of the assembly has a recess constituting all or a portion of the hollow region and open only at one of its faces, defining thereon a recess outline.

4. A method according to claim 3, wherein the strand of material, associated with the recessed plate defining a recess opening only at one of its faces, cooperates with a solid plate or with another recessed plate of the assembly.

5. A method according to claim 1, wherein at least one recessed plate of the assembly has a recess constituting all or a portion of the hollow region and open at its two opposite faces, this through recess defining a recess outline on each of the two opposite faces of the plate.

6. A method according to claim 5, wherein strand of material and another strand of material, each associated with a respective side of the recessed plate defining a through recess, cooperate with a solid plate or with another recessed plate of the assembly.

7. A method according to claim 1, wherein the assembly treatment is also carried out by hot isostatic pressing, at a pressure lower than that employed for the consolidating.

8. A method according to claim 7, wherein the assembly treatment carried out by hot isostatic pressing is followed by drilling the assembly, implemented so as to cause the recess to communicate with an outside of the assembly.

9. A method according to claim 1, wherein the assembly is constituted that before its treatment, an area in orthogonal projection in the stacking direction of the face of the plate having the recess is at least N times greater than an area of its associated strand of material, N being greater than 1.5, or greater than 3.

10. A method according to claim 1, wherein the assembly further includes, between each face of a recessed plate defining a recess outline and the plate of the assembly that is immediately adjacent in the stacking direction, a peripheral strand of material lying along the perimeter of these two plates, the subsequent assembly treatment also obtaining diffusion bonding of each peripheral strand of material to the plate(s) of the assembly with which it is in contact, to constitute, along their perimeter, a gas-tight connection of the two plates between which it is placed.

11. A method according to claim 1, wherein the hollow region takes a form of one or of a plurality of fluid circulation channels.

12. A method according to claim 1, wherein the module is configured to equip a heat exchanger system.

13. A method according to claim 1, wherein the module takes a form of a plate.

14. A method comprising:
    making an assembly of plates stacked in a stacking direction, said assembly of plates including a bottom plate with a hollow region open on an upper face and closed on a lower face and an upper plate disposed above the bottom plate,
    said making including disposing a strand of material comprising a linear element defining a closed line lying along and contacting the entire circumventing top edge of the hollow region at an intersection of the hollow region and a face of the plate with substantially all segments of the closed line of said strand of material along the entire circumventing top edge of the hollow region extending only along the top edge and not substantially extending over the hollow region; and
    initially bonding the plates and said each strand of material together by causing a diffusion bond of the strand of material to the bottom plate and the upper plate with which the strand of material is in contact.

15. The method of claim 14, wherein the making includes disposing the strand of material along the recess outline of the hollow recess and an outer peripheral edge of the bottom plate, and a zone, along a face of the bottom plate on which the strand of material is disposed, between the recess outline and the outer peripheral edge of the bottom plate, is devoid of the strand of material.

16. The method of claim 14, wherein a total width of the strand of material in a plane orthogonal to a stacking direction of the assembly of plates is smaller than a total width of the bottom plate in the plane.

17. The method of claim 16, comprising:
    obtaining the diffusion bond of the strand of material to the bottom plate and the upper plate with which the strand of material is in contact, and thereby forming, along the outer peripheral edge, a gas-tight connection of the bottom plate and the upper plate.

18. A method comprising:
    making an assembly of plates stacked in a stacking direction, said assembly of plates including a bottom plate with a hollow region open on an upper face and closed on a lower face and an upper plate disposed above the bottom plate, said making including disposing a strand of material in contact with an intersection of the hollow region and a face of the bottom plate with substantially all segments of said strand of material along an entire circumventing top edge of the hollow region extending only along the top edge and not substantially extending over the hollow region; and initially bonding the plates and said each strand of material together by causing a diffusion bond of the strand of material to the bottom plate and the upper plate with which the strand of material is in contact.

\* \* \* \* \*